United States Patent [19]
Rogat

[11] Patent Number: 6,006,408
[45] Date of Patent: Dec. 28, 1999

[54] VINYL WINDOW FRAME WELD SEAM CLEANER

[75] Inventor: Gunar Rogat, Aurora, Ohio

[73] Assignee: Wegoma, Inc., Twinsburg, Ohio

[21] Appl. No.: 09/036,161

[22] Filed: Mar. 6, 1998

[51] Int. Cl.[6] .................................................. B23C 3/12
[52] U.S. Cl. ........................................ 29/33 A; 409/140
[58] Field of Search ...................... 409/138, 139, 409/140, 163, 172, 197; 29/33 R, 33 A, 33 P, 564, 56.5, 56.6; 83/914

[56] References Cited

U.S. PATENT DOCUMENTS

| | | | |
|---|---|---|---|
| 3,703,114 | 11/1972 | Topopolsky et al. | 83/3 |
| 4,466,186 | 8/1984 | Maurus | 83/914 |
| 4,752,350 | 6/1988 | Schuster . | |
| 4,828,239 | 5/1989 | Grandy et al. . | |
| 4,909,892 | 3/1990 | Quinn et al. . | |
| 4,971,639 | 11/1990 | Quinn et al. . | |
| 4,995,935 | 2/1991 | Ganzberger . | |
| 5,006,198 | 4/1991 | Pasquial . | |
| 5,098,513 | 3/1992 | Budd . | |
| 5,125,495 | 6/1992 | Ganzberger et al. . | |
| 5,146,670 | 9/1992 | Jones | 409/138 |
| 5,362,428 | 11/1994 | Tsujino et al. . | |
| 5,370,835 | 12/1994 | Stürtz . | |
| 5,379,510 | 1/1995 | Berge | 29/564 |
| 5,439,546 | 8/1995 | Brickenstein . | |
| 5,448,819 | 9/1995 | Grassi | 29/33 A |
| 5,651,722 | 7/1997 | Werner | 409/140 |

FOREIGN PATENT DOCUMENTS

| | | | |
|---|---|---|---|
| 443398 | 8/1991 | European Pat. Off. | 29/33 A |
| 3321098 | 1/1985 | Germany | 409/139 |
| 3718149 | 12/1988 | Germany | 409/138 |
| 4118256 | 6/1992 | Germany | 409/138 |
| 889299 | 12/1981 | U.S.S.R. | 29/33 A |

*Primary Examiner*—Daniel W. Howell
*Attorney, Agent, or Firm*—D. Peter Hochberg; William H. Holt

[57] ABSTRACT

A vinyl weld seam cleaner having a fixed support head and a movable support head. The movable support head accommodates windows of varying widths. Each support head has an upper and lower machine head that houses a tool head. The tool heads have interchangeable tools. The machine head and tool head cooperate together to allow tools on the tool heads to move in three dimensions. The tools can clean and machine at a 45° angle along a weld seam or at a 90° angle relative to the top, sides and bottoms of a window frame. The window frame is engaged by an inner conveyor belt that moves the frame into and out of a first cleaning position for cleaning and machining the top corners of the window frame, and into and out of a second cleaning position for cleaning and machining the bottom corners. The inner conveyor includes fixed and movable fences, tabletop back fences, and clamps. The top corners are simultaneously cleaned and the bottom corners are simultaneously cleaned. The tool heads present themselves at a 30° angle toward the window frame.

45 Claims, 9 Drawing Sheets

VINYL WINDOW FRAME WELD SEAM CLEANER

BACKGROUND OF THE INVENTION

1. Field of the Invention

This invention relates to the manufacture of window frames and, in particular, to the cleaning of weld seams on vinyl window frames.

2. Description of the Prior Art

Vinyl window frames are composed of four members affixed at the ends by welding. Each member has a 45° angle at each end and forms a four-corner window frame when completed. The welding operation along the 45° angle leaves a welding bead along the weld seams. The bead is not aesthetic and interferes with the window fitting, and must be removed or cleaned. After the cleaning of the corners is completed, other operations are performed on the windows such as drilling and routing.

Present vinyl window frame weld seam cleaners provide a cleaning mechanism for the window corners, but cannot perform other operations such as drilling or routing. This is because the tool head and tools on the tool head perform their cleaning operations along an X and Y plane, and must be positioned at a 45° angle for aligning with the weld seam. Other tool operations are performed at a 90° angle with respect to the front, back or sides of the window frame, and require additional tool heads placed perpendicular to the top, bottom and sides of the frames to be machined to perform these operations.

An example of a single tool head corner cleaner is a manually run cleaner that takes a single window corner at a time. The window is rotated at a 45° angle by the operator and the corner placed in a 45° angle guide. The tool head is positioned in front of the operator and performs its cleaning operations. The operator then initiates the cleaning operation and the corner is cleaned. The operator then rotates the window to do another corner until all four corners have been cleaned. Additional tool operations are performed at a separate station. The speed of the cleaning is largely dictated by the skill and speed of the operator of the cleaning process and the speed of the subsequent machining operation.

A two machine headed tool cleaning machine call be manually operated or can be automated. In either case, each machine head is placed at a 45° angle transverse with one another. The window frame is loaded such that both corners of the front of the window frame are cleaned simultaneously by the machine heads. The tool heads of the machine head present themselves and clean along the X and Y axis. A second operation must be performed by loading the other back of the frame to clean the remaining two corners. Additional machine operations may be performed on a separate station, or additional tool heads may be added for 90° operations. The entire operation is time consuming, tedious and operator dependent.

A four-headed window weld frame cleaner includes four heads positioned at different 45° angles that simultaneously clean all four corners of the window. The machine heads again present themselves at a 45° angle and clean along an X and Y axis. Additional tooling operations may be performed at a separate station or additional tool heads added at each corner to perform 90° operations.

If one head is not operational in a one-, two- or four-headed machine, the entire machine cannot be used. Additionally, operations performed on the front, back or sides of the window frames cannot be accomplished by these machines, and must be performed at a separate station or additional tool heads must be added to the current machine. Most of these machines must be reprogrammed and/or be manually adjusted to be used on windows of different sizes and types.

The present invention alleviates the problems with the prior art by providing a fully automated two-headed window cleaner, that performs both 45° and 90° operations on all four corners of a vinyl window frame in a single operation. The present invention can be used on a variety of different types and sizes of windows without adjustment or reprogramming. Finally, the present invention performs operations faster and more efficiently than the prior art.

SUMMARY OF THE INVENTION

In accordance with a preferred embodiment of the present invention, there is provided a vinyl weld seam cleaner having a fixed support head and a movable support head. The movable support head moves horizontally relative to the fixed support head to accommodate windows of various widths. Means are provided for allowing tools to move in three dimensions. The tools are used for removing or cleaning a weld seam at a 45° angle. The cleaning is performed on two corners at the front of a window frame in a first cleaning position, and the other two corners at the back of the window frame in a second cleaning position. Other tools are provided for performing machining operations at a 90° angle relative to the front, back, top, bottom, or sides of a window frame. In the first cleaning position, the front corners of the window frame are cleaned and machined. In the second cleaning position, the back corners of the window frame are cleaned and machined.

In a preferred aspect of the invention, each support head has an upper and a lower machine head. Further, each machine head houses a tool head. The machine heads move vertically along a Z axis. The tool heads move along an X and Y axis. The machine head and tool head cooperate to move tools for cleaning and machining along a 45° angle, and along a 90° angle relative to the window frame's front, back, or sides. The tools on the tool heads may be positioned at a 45° angle along the axis of the weld seam of the front corners of the window frame, and have a second position at a 45° angle along the axis of the weld seam at the back corners of the window frame. The tools clean and machine the window frame corners as the frame passes through the machine along an inner conveyor. The combination of movement in the X and Y direction move the tools along the 45° angle by interpolation, that is simultaneously moving along the X and Y axis. This causes the tools to be moved or be dragged along the weld seam of the window frame. Adding movement in the Z direction allows the tool heads to move in any three dimensional direction from 0° to 180°.

It should be appreciated that interpolation is the method that allows a single tool head to clean the forward and backward corner of the top or bottom of a window frame. This method of interpolation can be further used to clean raised portions on the top or bottom of a window frame by interpolation in the Z direction.

Top tool heads preferably move along a 30° angle downwardly toward the window frame while bottom tool heads move along a 30° angle up toward the window frame. The tool heads include tool holders for holding tools and allowing the tools to be interchangeable. The tool heads and tool holders can present the tools quickly and extract the tools quickly. In this way, top tool heads can perform their operations, while the bottom tool heads present themselves and prepare to perform their operation, beginning at the end of the top tool heads' operations. The next operation of the top tool heads present themselves and wait for the finishing of the bottom tool heads. The alternating top and bottom operational method eliminates the presentment time of subsequent tool operations and increases overall throughput time.

In another preferred aspect of the present invention, there is provided a window seam cleaner as described above having an inner conveyor that moves vertically and its belt that moves horizontally. The inner conveyor has a first position in an inactive state and a second position in an active state for engaging the window frame. The inner conveyor includes belts for moving the window frame through the machine in and out of the first and second cleaning positions. The conveyor includes sensing means for detecting when the window frame is in the first and second cleaning position. Preferably, the mounting apparatus for the inner conveyor includes a pair of fixed side fences adjacent to the fixed support head, and a second pair of fixed side fences adjacent to the movable support head during cleaning and machining. Movable side fences extend from each fixed side fence, and move parallel and longitudinally with respect to the fixed side fences. Each movable side fence can cooperate with a side bracket to clamp down the sides of the window frame during cleaning and machining. Additionally, the mounting apparatus for the inner conveyor includes a tabletop back fence having an inactive position and an active position. In the active position, the back fence stops the window frame from travelling along the inner conveyor as it is being loaded in the first and second cleaning position. The back fences can also assist in positioning the window frame in the first and second cleaning position. The tabletop back fences cooperate with back clamps to hold the front or back of the window frame during cleaning and machining.

In another preferred aspect of the invention, side clamps have a first holding position for cleaning along a 45° angle and machining the sides of a window frame, and a second position for machining along the front and back of the window frame. Further, movable side fences move from one of a fully retracted position to a fully extended position. Additionally movable side fences could move to a third position for cleaning along a 45° angle.

An object of the present invention is to provide a machine for cleaning the weld seams of vinyl window frames, which device can simultaneously clean at least two corner areas of the window frames.

Another object of the present invention is to provide a machine with tool heads that can present themselves for operation prior to the end of a prior tool head operation to improve throughput time.

Another object of the present invention is to provide a machine having tools for cleaning angular weld seams of vinyl window frames, which can operate at seam angles that extend in directions 90° from each other, with tool heads to operate on the adjacent corners of a rectangular window frame.

A further object of the present invention is to provide a machine for cleaning the weld seams of vinyl window frames having a clamping arrangement with clamps that can be positioned to allow a single tool head to clear and machine along a weld seam and sides of a window frame in a first clamping position, and to machine the front and back of a window frame in a second clamping position.

Another object of the present invention is to provide a system for cleaning the weld seams of vinyl window frames having at least a pair of cooperating conveyor systems for improving the loading and unloading time to a device in the system having tools for removing the seams of vinyl window frames.

Yet another object of the present invention is to provide an improved device for cleaning the welds of a vinyl window frame having tools which can move in at least two directions, reducing the number of tools required to clean the welds, thereby making the device more compact, faster operating, and wish greater safety with respect to the protection of the tools in the device than in the prior art.

The general object of the present invention is to provide a machine for cleaning the weld seams of vinyl window frames which is faster to operate, which operates in a precise and reliable manner, and which is efficient and economical.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DESCRIPTION OF THE PREFERRED EMBODIMENT

Figure 1:
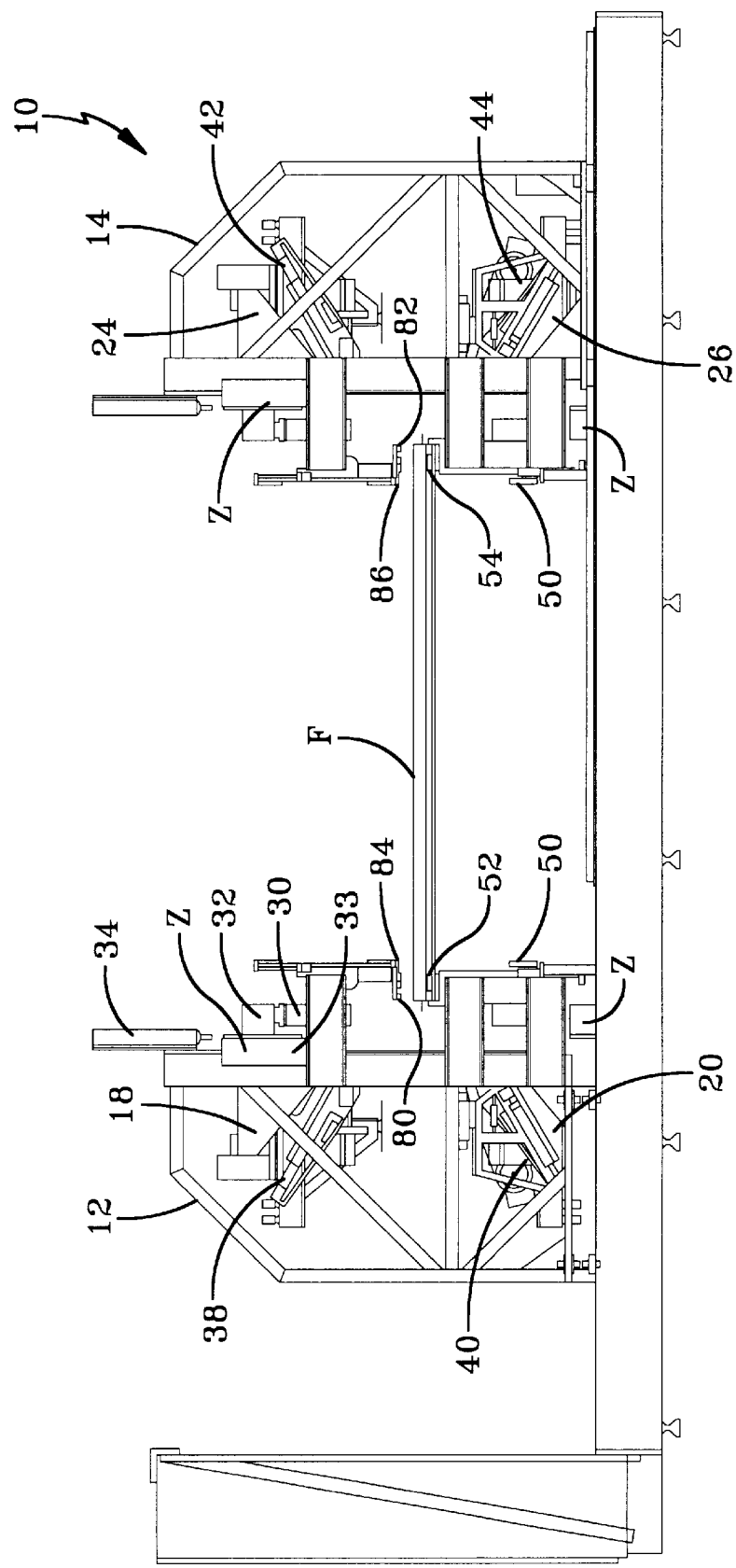
FIG. 1 is a front view of a preferred embodiment of the invention.

Referring now to the drawings wherein the showings are for the purpose of illustrating the preferred embodiment of the invention only, and not for the purpose of limiting the same, FIG. 1 shows a front view of a vinyl vwindow weld seam cleaning machine 10. FIG. 1 shows the machine 10 with a fixed support head 12 having fixed upper machine head 18 and a fixed lower machine head 20. Machine 10 further has a movable support head 14 opposing fixed support head 12, and on which are mounted a movable upper machine head 24 and a movable lower machine head 26.

Movable support head 14 moves horizontally relative to fixed support head 12 along the W axis (see FIG. 8) via a servo motor, gear and gear rack arrangement (not shown) to accommodate window frames of varying widths. Each of the foregoing machine heads travel vertically along the Z axis. As can be seen in fixed upper machine head 18, the machine head moves in a vertical direction by means of a servo motor 30, a gear 32 and a gear rack 33. A pneumatic balance cylinder 34 is a (counter balance cylinder for counteracting the force of gravity when the machine head moves and stops along the Z axis. Each of the foregoing machine heads has an identical servomotor, gear and gear rack, and pneumatic balance cylinder for moving the head along the Z axis. Each of the foregoing machine heads has movable tool heads as described below. The tools on the tool heads are used to clean vinyl welds on vinyl window frames or to machine the window frames.

Fixed upper machine head 18 has a movable tool head 38, and a movable lower tool head 40 is mounted on the fixed lower machine head 20. Movable upper machine head 24 has a movable tool head 42, and movable lower machine head 26 has a movable tool head 44. The tool heads each have a set of tool holders for holding tools that perform various machining operations on the vinyl window frame, primarily directed to the cleaning of the weld seams on the vinyl window frames. Movable tool heads also have apparatus for moving vinyl window frames into place on the weld cleaning machine 10, as described below.

As can be appreciated the invention can be comprised of a single support head having a top and bottom tool head enclosed in a top and bottom machine head, respectively. The operation on the window frame would of course only be performed on one side of the frame at a time on two corners and a second operation would need to performed on the other side of the frame for the remaining two corners. This single support head set up may be advantageous if factory floor space is limited or costs need to be minimized.

Figure 2:
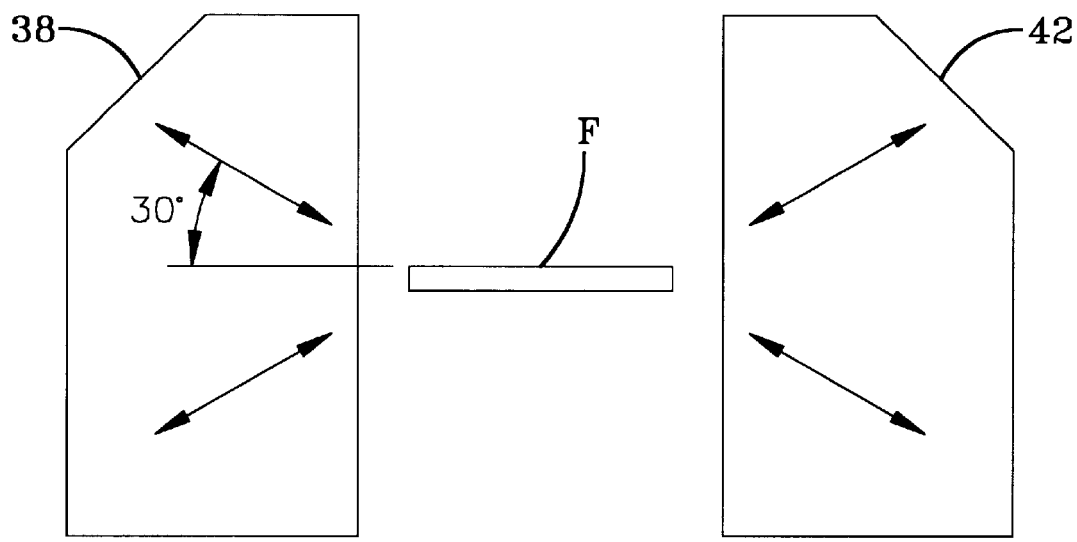
FIG. 2 is a front schematic view of top tool heads presenting themselves at a 30° angle down toward a frame F.
Figure 3:
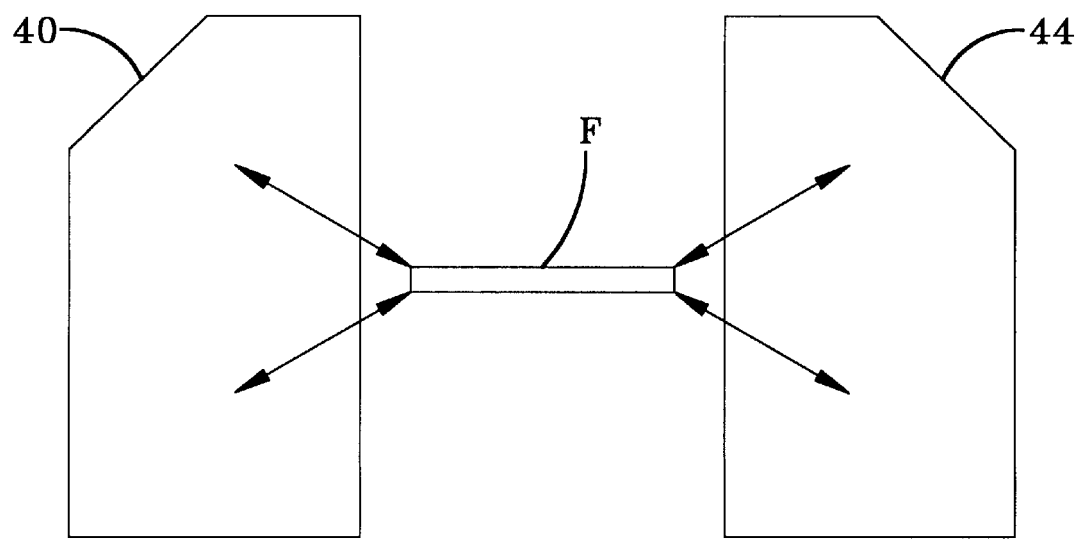
FIG. 3 is a front schematic view of bottom tool heads presenting themselves at a 30° angle up toward a frame F.
Figure 4:
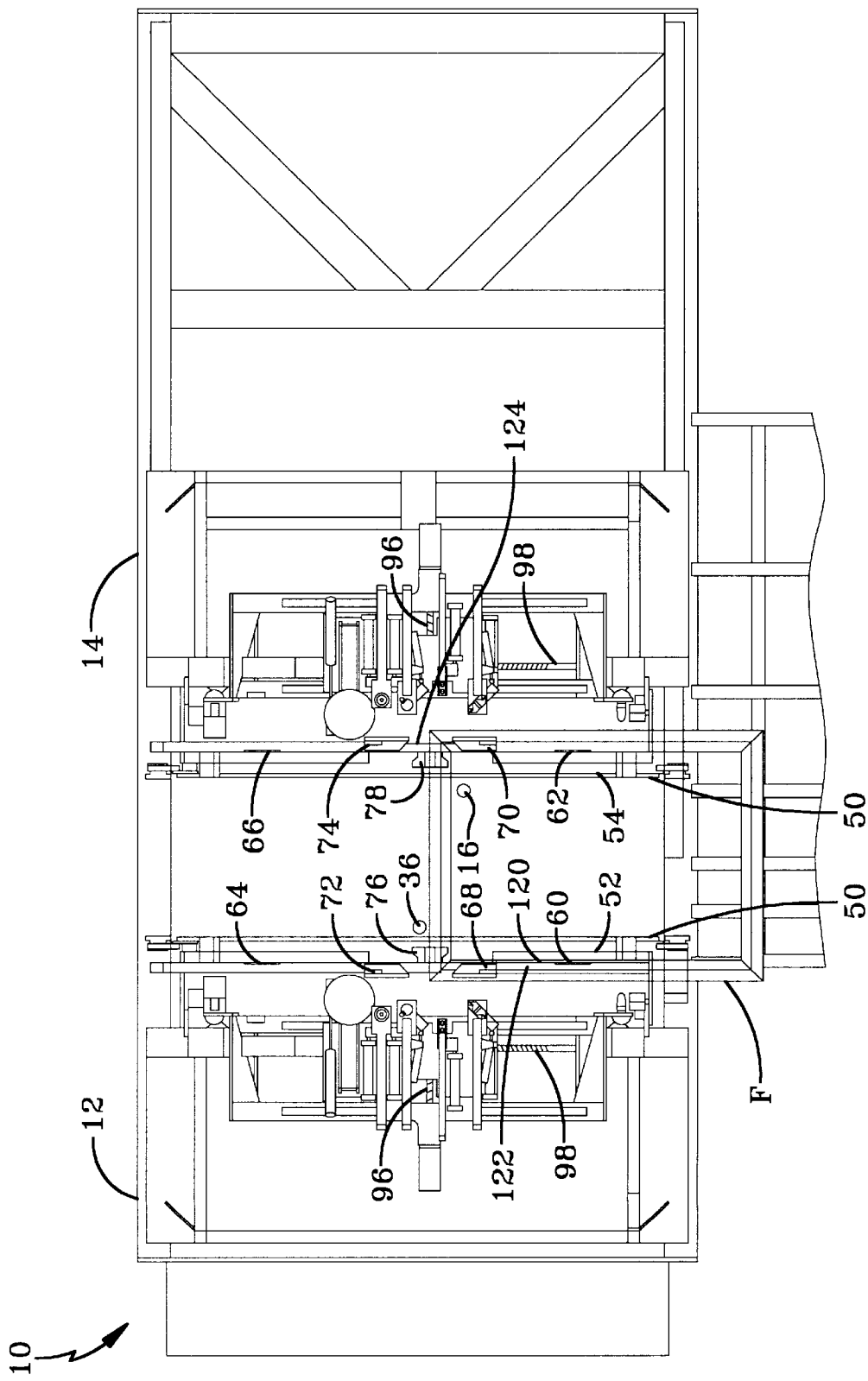
FIG. 4 is a top view of the preferred embodiment of the invention showing tabletop back fences and movable side fences.
Figure 5:
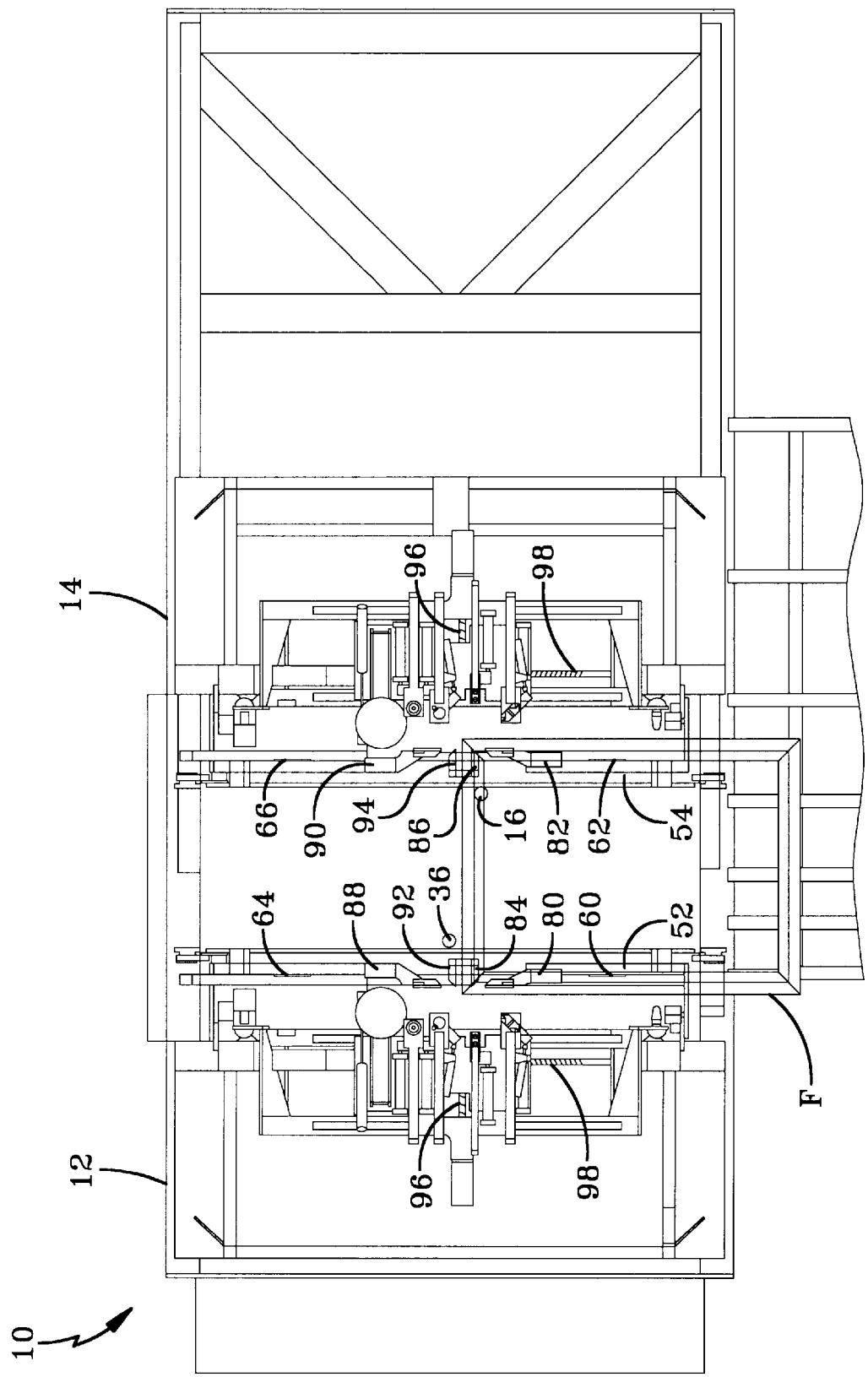
FIG. 5 is a top view of the preferred embodiment of the invention showing back clamps and side clamps.

As best shown in FIGS. 1–3 each movable tool head 38, 40, 42 and 44, is built on and present themselves to the window to be machined and cleaned on a 30° angle toward a plane parallel with the floor, by way of a rotatable screw with a stationary (stationary with respect to the movable tool head) ball nut 96, shown in FIG. 4 and FIG. 5. Top movable tool heads 38 and 42 present themselves down at a 30° angle toward the top of the corners on window frame F, as shown in FIG. 2. Bottom movable tool heads 40 and 44 present themselves upwardly at a 30° angle toward the bottom of the corners to be cleaned on window frame F, as shown in FIG. 3. This allows the tool heads and the tool holders to present themselves quicker than tool heads presented horizontally and then vertically. It further ensures that the tool heads and tool holders can move out of the way quickly, so that the next operation can be performed as soon as the earlier operation is completed. Upper tool heads 38 and 42 simultaneously perform the same operation on opposite corners, while lower tool heads 40 and 44 are waiting to start the second operation. This top-then-bottom method eliminates the time necessary for presenting the tool for the next operation because presentment occurs during the previous operation.

Figure 6:
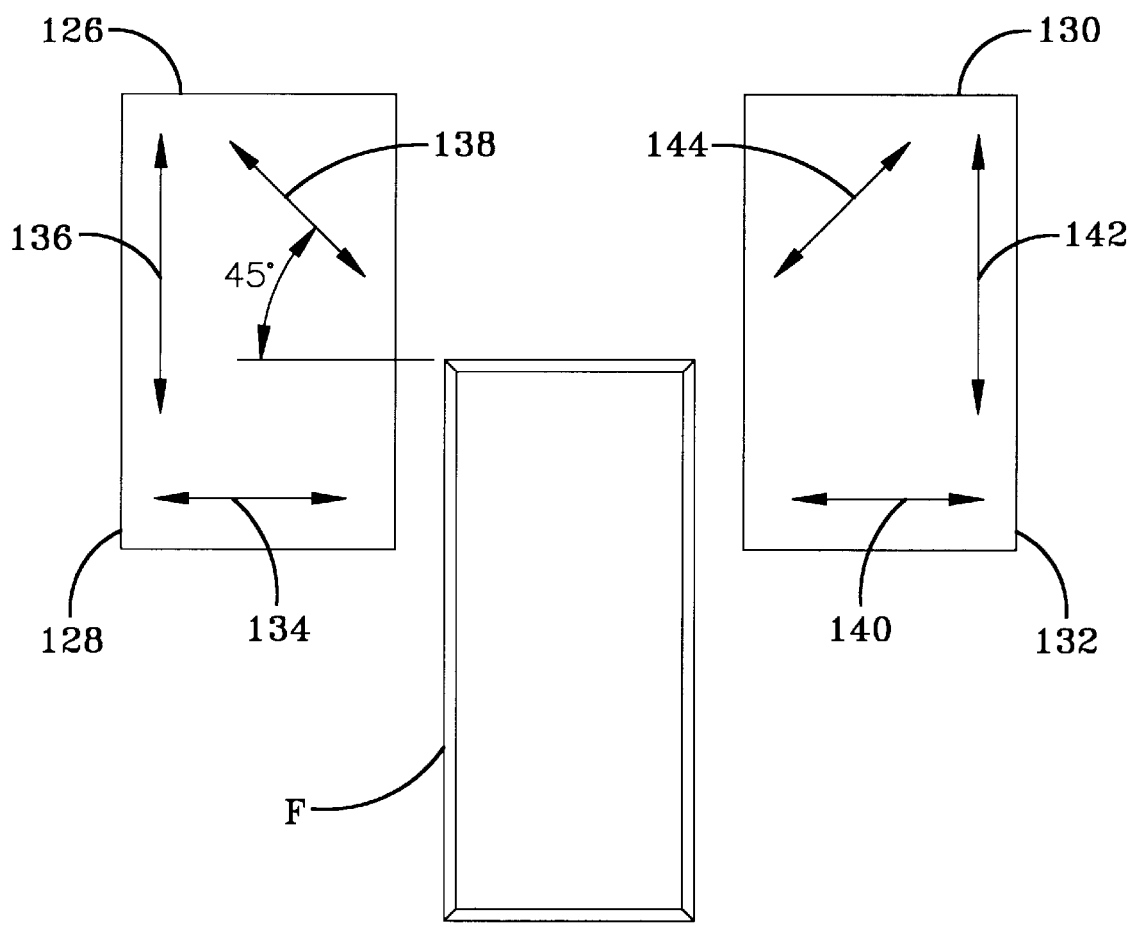
FIG. 6 is a top schematic view of tool heads cleaning on a 45° angle by interpolation in a first cleaning position.
Figure 7:
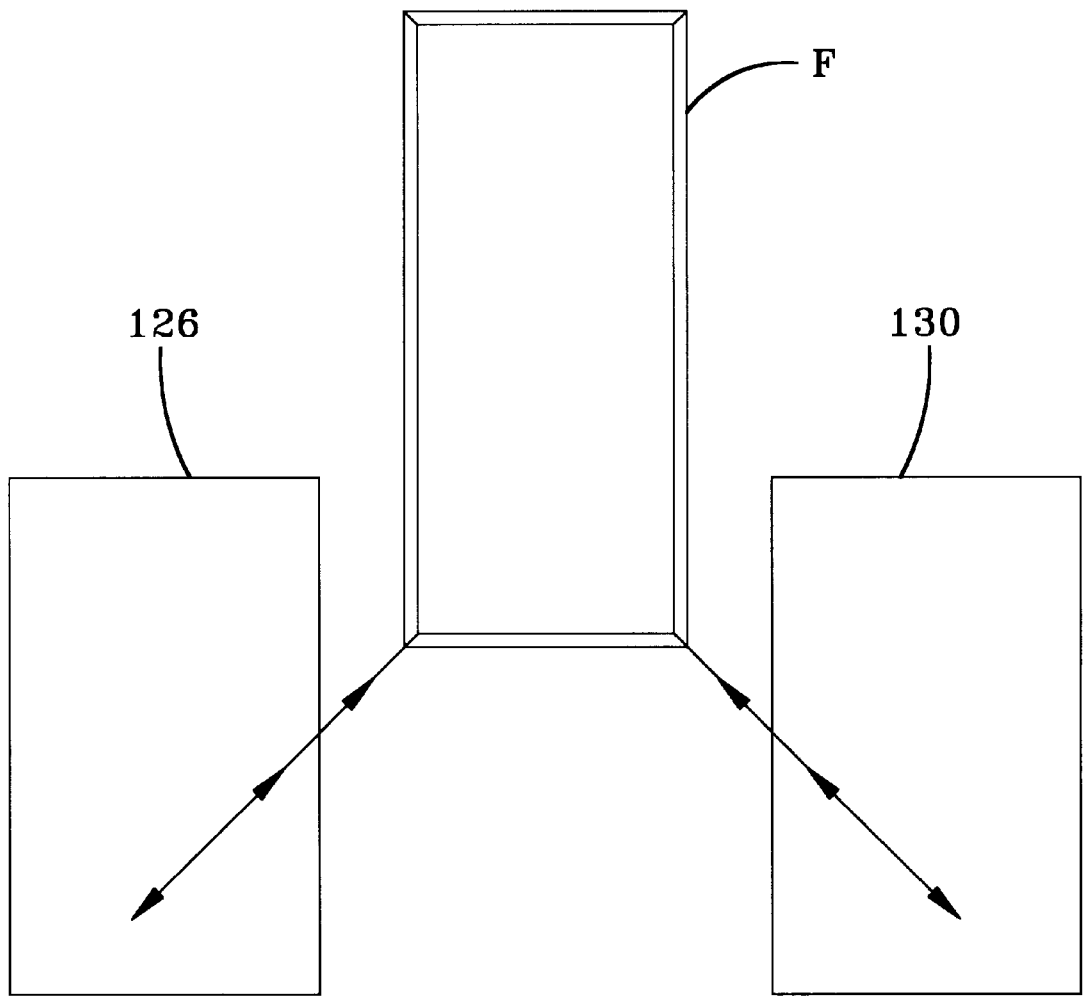
FIG. 7 is a top schematic view of tool heads cleaning on a 45° angle by interpolation in a second cleaning position.

Referring to FIGS. 4 and 5, rotatable screw with non-rotating or stationary ball nut 96 move the tool heads along an X axis while a rotatable screw with a non-rotating or stationary ball nut 98 moves the tool heads along an Y axis. By combining the movement of the machine heads with the movement of the tool heads, the tool heads can move three-dimensionally along the X, Y and Z axis. As can be seen in FIGS. 6 and 7, the tool heads can be moved along the X or Y axis, and by using interpolation the tool heads can move or be dragged at a 45° angle along the weld seam of window frame F's corners. Referring to FIG. 6, a tool head 126 of a fixed head 128 is shown which is movable in the X direction by a rotating screw or the like and in the Y direction by a perpendicular rotating screw. Tool head 126 is shown as being movable in the X direction 134 and in the Y direction 136. If movements in the 134 and 136 or X and Y directions occur simultaneously, this is interpolated into movement in the combined direction shown by arrows 138. If the movement occurs at the same time and at the same rate, the net movement of fixed machine head 128 would be in the 45° direction, as shown by arrows 138. Likewise, movable tool head 130 on movable machine head 132 is movable along an X axis 140 and an Y axis 142 by means of rotating screws or the like. If this movement along the X and Y axes occurs simultaneously, this is interpolated into a movement in the 45° direction, as shown by arrows 144. In fact, these tools could be moved in any direction according to the invention. Because the construction according to the present invention enables the tools to be moved simultaneously in one, two, or three directions, any angular relationship is possible.

Tools on the tool head that move on a 45° angle have a first position aligned with the corners at 45° at the first cleaning position for cleaning the front of the window frame F as shown in FIG. 6. The tools then swivel 90° angle for aligning along a 45° angle in a second cleaning position for cleaning the back of the window frame F as shown in FIG. 7. The tools that operate on a 45° angle alternate between these two positions by means of a pneumatic cylinder. Other tools in the tool head can move along the X and Y axis and machine the front, back and sides of window frame F. In this way, all four corners of a window frame can be cleaned and machined by two tool heads in a fast and efficient manner.

Figure 8:
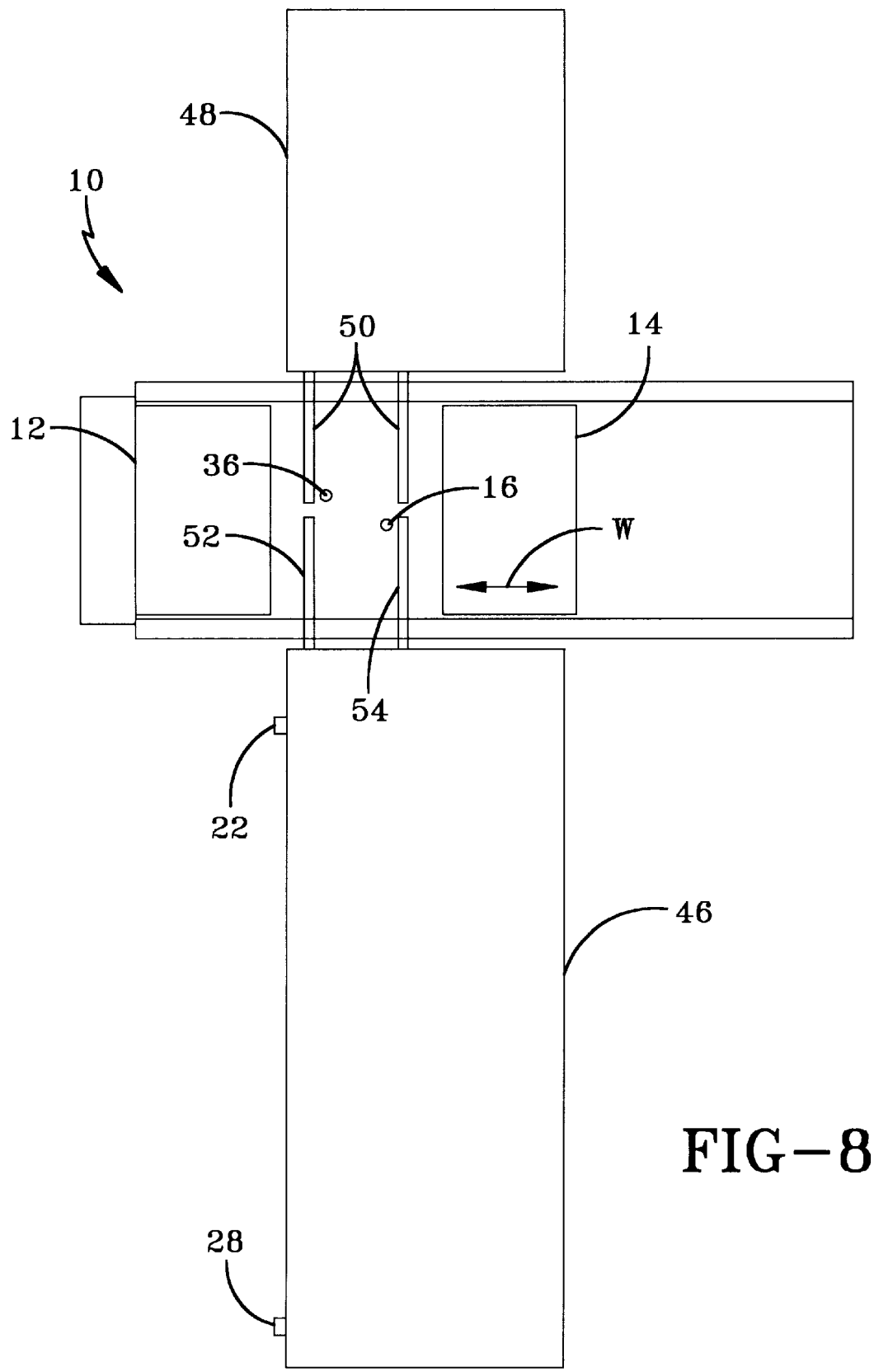
FIG. 8 is a top schematic view of the preferred embodiment of the invention including an input and output conveyor.

As shown in FIG. 8, an input conveyor 46 is provided for moving window frames F into machine 10 and enabling the staging of many windows. Photo sensors or photo eyes 22 and 28 are used on the conveyor to let the machine know that a frame is ready for loading into the machine for cleaning and machining. An output conveyor 48 is used for unloading the windows after all corners have been cleaned. Referring to FIGS. 1, 4, 5 and 8, machine 10 has a mid-conveyor system 50 having a pair of belts 52 and 54 for loading and unloading of window frame F. The belts are movable in the vertical direction for raising belts to the active position for moving frames F, and are movable downwardly to an inactive position during cleaning or when the machine is not in use. The belts are raised and lowered by the use of pneumatic cylinders. Photo sensors 16 and 36 detect the presence of a frame in a first cleaning position and a second cleaning position, respectively.

As best seen in FIG. 4, machine 10 further has a first pair of opposing longitudinally fixed side fences 60 and 62 for holding a window frame F during a machine operation in a first cleaning position, and a second pair of opposing longitudinally fixed side fences 64 and 66 for holding a frame F during a machine operation in a second cleaning position. Each fixed side fence has a generally L-shaped configuration with a base part 120 being parallel to the ground and a vertical part 122 extending upwardly. The machine further includes a first pair of movable side fences 68 and 70 that move longitudinally with and parallel to the respective fixed side fences 60 and 62, and a second pair of movable side fences 72 and 74, which move longitudinally with and parallel to the respective fixed side fences, 64 and 66. Both fixed and movable fences cooperate to guide the vinyl window frame in and out of machine 10. Machine 10 includes a pair of table top back fences 76 and 78 that have a front vertical surface for positioning a frame in the first cleaning position, and a back vertical surface for positioning a frame in a second cleaning position. Back fences 76 and 78 are movable in the vertical direction for being in an active position during machining or cleaning of frame F, and are movable downwardly to an inactive position when frame F is moving in and out of the first and second cleaning position.

Figure 9:
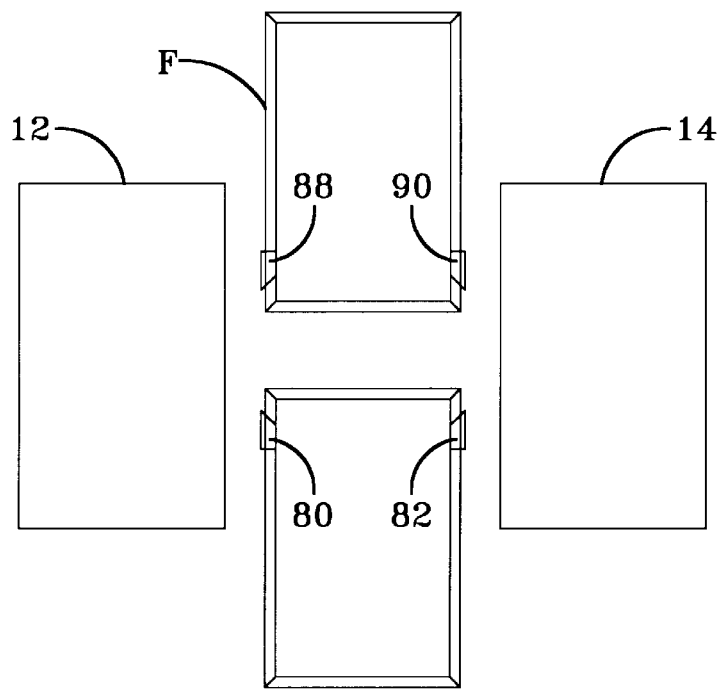
FIG. 9 is a top schematic view of the preferred embodiment of the invention showing side clamps in a first position for corner cleaning.
Figure 10:
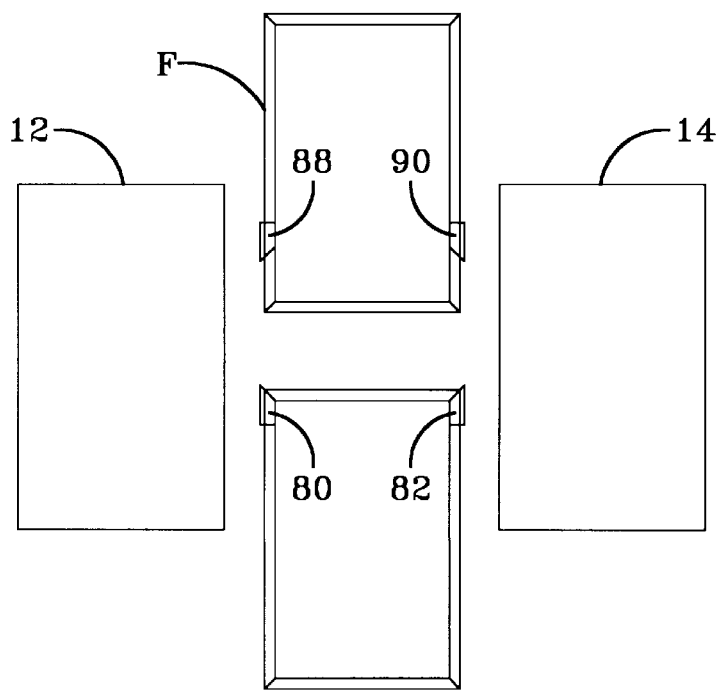
FIG. 10 is a top schematic view of the preferred embodiment of the invention showing side clamps in a second position for routing.

Referring now to FIG. 5, a first pair of side clamps 80 and 82 and a first pair of back clamps 84 and 86 are provided for releasably holding a received window frame in place during the machining operations of frame F in its first cleaning position. A second pair of side clamps 88 and 90 and a second pair of back clamps 92 and 94 are provided for releasably holding a received window frame, in place during the machine operations of frame F in its second cleaning position. Side clamps 80, 82, 88 and 90 have a first position as shown in FIG. 9 for cleaning the window frame corners, and a second position as shown in FIG. 10 for performing machining operations that require a sturdier hold on the corners during machining. All clamps move vertically so that they can be in an active position while holding frame F during machining and cleaning, and in an inactive position when frame F is moving through the machine or when the machine is inactive.

Figure 12:
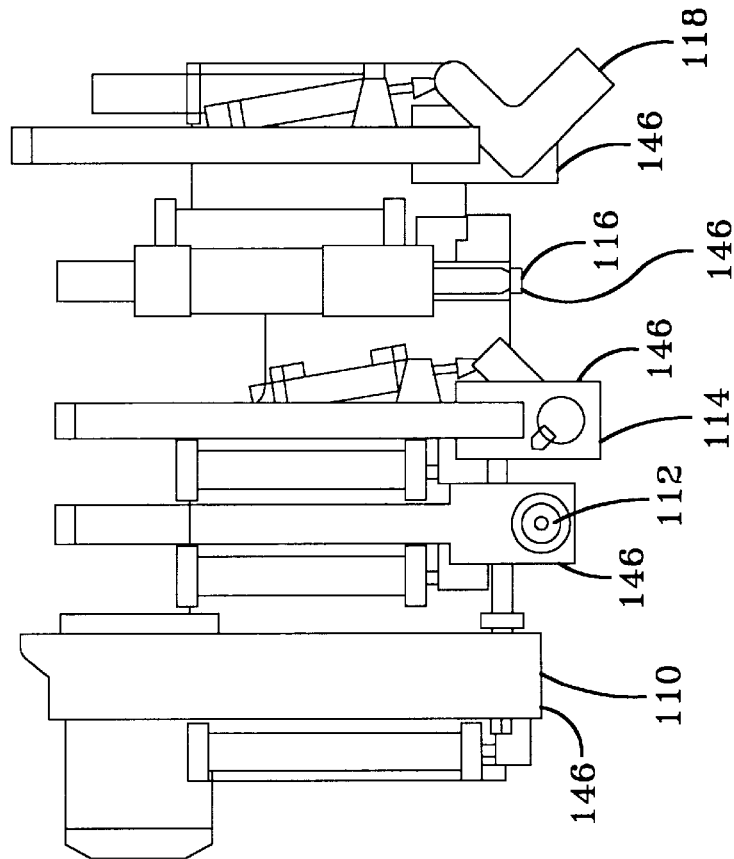
FIG. 12 is a top view of a typical tool head and tools in the bottom tool head of a preferred embodiment.
Figure 11:
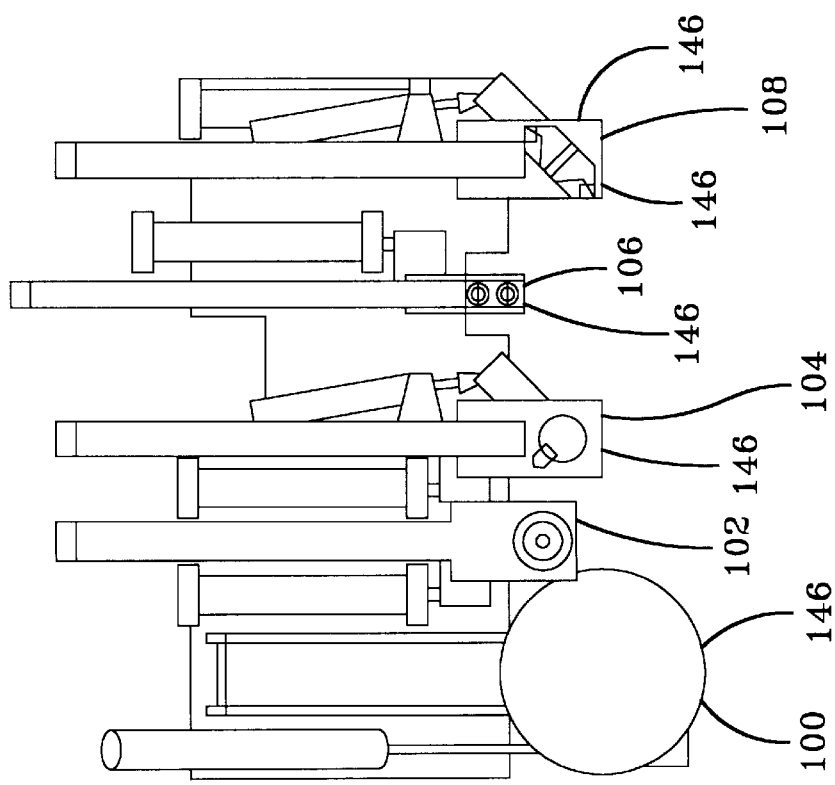
FIG. 11 is a top view of a typical tool head and tools in the top tool head of a preferred embodiment.

Each tool head as shown can house five tools. The tools are held by tool holders, and the tools can be changed out for different types of window applications and particular cleaning and machining operations. For example, in some window applications a router is not necessary and may be replaced with a buffer for putting a shiny gloss on the window corners or by some other tool. FIGS. 11 and 12 show a particular embodiment of the invention, but it is understood many types of tools can be changed for different window applications. FIG. 11 shows an arrangement that is the same for both top tool heads 38 and 42. The tool heads hold tools by tool holders 146. The tool head has a cutter disk 100, a vertical drill 102, a horizontal and vertical scarf 104, a pull-in block 106 and a glass leg punch 108. FIG. 12 shows an arrangement that is the same for both bottom tool heads 40 and 44. This tool head has a tilt latch router 110, a vertical drill 112, a horizontal and vertical scarf 114, a pivot bar router 116 and a horizontal inside router 118.

Machine 10 further includes a computer for storing and running a standard operating software. The software includes a graphical user interface (GUI) so that a programmer can program different window frame profiles or application programs into the computer. The programs run servo drive cards, switches that drive cylinders, read sensors, reads back motor positions and can drive other devices depending on the type of application needed. The computer further includes a network card so that a welder machine can communicate to the weld seam cleaner the type and size of window coming down the conveyor. Networking can eliminate the step of manually loading input conveyor 46, and can eliminate the step of an operator choosing the appropriate window profile for the type and size of window frame being worked on.

In explaining the operation of machine 10, an example will be used of a window requiring a tilt latch at its first end and a pivot bar on the other end. Therefore, machining for the insertion of the tilt latch and pivot bar is required. Additionally, the window used has four members welded together at a 45° angle to form a rectangular frame as shown in the drawings. The predetermined application program is chosen manually by an operator or automatically by communication over a network. Referring to FIGS. 4, 5 and 8, movable head 14 moves toward fixed head 12. Side fences 62 and 66 move toward side fences 60 and 64, respectively. The movable head stops within a half of an inch (or some other distance) of the width of frame F until the first frame is loaded. The movable head then gradually moves in the additional one-half inch such that the edges of the window align with the fixed side fences and stays in this position for all remaining frames of that predetermined size.

As shown in FIG. 8, the conveyor belt system 46 moves a vinyl window frame F along the conveyor belt. Photo sensors 22 and 28 on the input conveyor tell the computer if a frame is ready for loading. When photo sensor 22 is tripped, inside conveyor 50 begins to rotate and both inside conveyor 50 and table top back fences 76 and 78 rise to the active position. Movable fences 68 and 70 move to a completely retracted position so that they are flush with fixed side fences 60 and 62 in preparation of receiving a frame. Side clamps 80, 82, 88, 90 and back clamps 84, 86, 92, 94 are up in the inactive position. Input conveyor 46 loads a window frame F onto inside conveyor 50. Inside conveyor 50 receives the frame and guides the frame along fixed side fences 60 and 62 and movable side fences 68 and 70, toward table top back fences 76 and 78. The edge of the frame makes contact with the front surface of the tabletop back fences 76 and 78 and trips photo sensor 16. The tripping of photo sensor 16 tells machines 10 that a frame is loaded. Inside conveyor 50 drops down to an inactive position and input conveyor 46 stops rotating. The frame is now supported by fixed fences 60 and 62 and movable side fences 68 and 70.

Top tool heads 38 and 42 move along the Y axis by way of ball nut and ball screw 98. Pull in blocks 106 on both tool heads 38 and 42 are extended on a 30° angle by using pneumatic connections. Pull in blocks ire lowered by rack 33 and pinion 32 on machine head 18 and 24 to the top inside surface of frame F. The pull in block is then moved along the Y axis 142 toward table top back fences 76 and 78 and pull frame F toward table top back fences 76 and 78, until the forward surface of the window frame F is flush with the front surface of back fences 76 and 78. Movable side fences 68 and 70 now move to a second position extending away from fixed side fences 60 and 62. Side clamps 80 and 82 clamp down on the sides of the window frame in a first position as shown in FIG. 9, directly above movable side fences 68 and 70. Simultaneously, back clamps 84 and 86 clamp down directly above tabletop back fences 76 and 78 to secure frame F for 45° operations. Once window frame F is clamped into place, the cleaning operations commence. These cleaning operations are designed to remove welding residue or flash from the respective weld seams of the window frame. The tools are servo-operated and are located on tool heads 38, 40, 42 and 44. Tool heads 38, 40, 42 and 44 are all movable in at least one of the following directions: the horizontal or X direction, the longitudinal or Y direction, and the vertical or Z direction, or combinations thereof. The tool heads have different tools depending on the operation they are to perform and can work simultaneously with other tool heads.

Considering first tool head 38 on fixed upper machine head 18, this tool head moves in the X direction by means of a rotating screw 96, and moves in the Y direction by means of a rotating screw 98 as described earlier. Tool head 38 can appropriately have the following tools or moving devices: pull-in block 106, which as noted earlier seats the window frame F against the table top back fences 76 and 78, a glass leg punch 108, which only moves in the X direction, a horizontal and vertical scarf 104, which holds two cutting tools for removing vinyl residue from a corner of the window frame and moves at a 45°; a vertical drill 102; and a contoured cutter disc 100, which moves in the 45° direction. In this particular embodiment, one set of tools for removing the weld flash from vinyl window frame F, as discussed with respect to lower tool heads 40 and 44, includes a horizontal internal router ("HIR") 118 for cleaning the inside corner of window frame F, which inside corner is not observable from the vertical direction (the HIR being movable in the 45° direction); a pivot bar router ("PBR") 116, which is movable on the X axis only and drills a hole for a pivot bar used for rotating the window frame when it is installed; a horizontal and vertical scarf 114 having two tools or knives and being movable in the 45° direction, a vertical drill 112 for cleaning certain weld seam flashes, and a tilt-latch router ("TLR") 110, which mills a slot for a sliding load latch and is only movable in the X direction.

Returning now to the operation of the weld seam cleaning machine, once window frame F is pulled in by pull-in blocks 106 and is clamped into the first position as discussed above, the machine is ready to perform the 45° cleaning operations. During the pull-in block operation lower tool heads 40 and 44 present themselves for their first operation. As pull-in blocks 106 finish their operation, vertical drills 112 on the lower tool heads 40 and 44 begin cleaning while scarf knives 104 on upper tool heads 38 and 42 position themselves for their operation. The scarf knives 104 perform their cleaning and bottom scarf knives 114 position themselves and begin their operation. Cutter disks 100 then position themselves and begin their operation. After the cutter disks 100 are finished, the 45° cleaning operations are completed.

Back clamps 84 and 86 disengage with frame F, back fences 76 and 78 move down and movable side fences move into a fully extended condition away from fixed side fences. The clamps move into their second position as shown in FIG. 10. The position of the clamps and back fences create a sturdier hold on the corners during machining operation so that the frame does not vibrate during tilt latch routing and punch knife operation. Additionally, back fences and back clamps get out of the way so that they do not interfere with machine operations. The machine then again returns to a top then bottom operation. Glass leg punch 108 on top tool heads 38 and 42 perform their operation while bottom tilt latch router 110 of bottom tool heads 40 and 44 present themselves. The tilt latch routers 10 on the bottom tool heads 40 and 44 perform their operation once the glass leg punches are complete. All cleaning and machining operations are now finished on the first two corners, and the window is ready to move on to the second cleaning position. It should be appreciated that this top then bottom methodology was found optimal for this particular embodiment. However, the tools can be programmed to operate simultaneously or in any order that may be desired.

When all of the machining is completed at the forward end of window frame F, side clamps 80 and 82 open and conveyor 50 moves up to an active position to engage frame F. Movable side fences 72 and 74 move in a fully extended position away from fixed side fences 64 and 66. Since 90° angle machining operations are not required on the bottom of frame F for this particular embodiment, movable side fences 72 and 74 only have two positions, fully extended and fully retracted. Movable side fences 68 and 70 are already in a fully extended position from the last machining operation. This minimizes a gap 124 when the frame F crosses into the frame's second cleaning position.

Conveyor belts 52 and 54 move window frame F across the gap between fixed side fences 60, 62 and movable side fences 68 and 70, to place the window frame F between fixed side fences 64 and 66, and movable side fences 72 and 74 into a second frame cleaning position until the trailing edge of frame F passes a photo eye 36. When photo eye 36 is passed, belts 52 and 54 are reversed in their direction, and the tabletop back fences 76 and 78 rise. A single hydraulic cylinder is used for raising the tabletop back fences 76 and 78. Conveyor belts 52 and 54 move window frame F into engagement with the rear vertical surface of back fences 76 and 78 until the window frame F again passes the photo eye 36. When photo sensor 36 detects the window frame F for the second time conveyor belt 50 drops down to an inactive position. Pull-in blocks 106 of movable tool heads 38 and 42 urge window frame F against back fences 76 and 78 into its second machining position. Side clamps 88, 90 and back clamps 92, 94 move down to fix window frame F in position for machining and cleaning. Since 90° operations are not performed on the bottom corners of this particular embodiment, the clamps have only one or two positions as shown in FIG. 9. The first position is for 45° cleaning operations and for creating a pivot bar router hole on the bottom side of the window frame F. However, if a tool such as a cutter disk is used it becomes desirable to have and additional position for the clamps, farther away from the corners as shown in FIG. 10. The exact same operations are performed on the bottom corners of frame F except the leg punch operation and tilt latch router are replaced by the pivot bar router operation. Although not required for the particular window frame being machined in the present operation, other window frames would require the operation of vertical drill 102 on top tool heads 38 and 42.

After completion of the machining operations on the second cleaning position, movable side fences 72 and 74 fully retract against fixed side fences 64 and 66 to an offloading position. Side clamps 88 and 90 and back clamps 92 and 94 open. Back table fences 76 and 78 drop down and conveyor 50 moves up to engage frame F for offloading. Belts 52 and 54 move frame F off of conveyor 50 and onto output conveyor 48. The machine then returns to its initial position and is ready for the next window frame.

It should be appreciated that machine 10 can be cascaded with other machines for performing machining on multiple frames at one time. This can be accomplished by adding a duplicate machine where output conveyor 48 would be placed. In this embodiment the first frame passes through the first machine into the second machine, a second frame then is loaded into the first machine. Both frames are operated on at the same time. Cascading the machines provides a twofold advantage. First, the amount of frames that can be cleaned and machined is approximately doubled. Second, if any one of the heads or machines breaks down or requires maintenance, the other machine can continue operating while repairing of the first machine is being completed. This avoids unnecessary down time during peak production hours.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention or the equivalents thereof.

Having described the invention, the following is claimed:

1. A vinyl weld seam cleaner apparatus for cleaning the weld scam of a rectangular vinyl window frame having four 90° angle corners formed by a front end, back end and sides of the frame, the frame having a top and a bottom, said apparatus comprising:

at least one support head, each of at least one support head having a top tool head and a bottom tool head;

transport means for moving a vinyl window frame into and out of at least one operating position located at a position adjacent said at least one support head cry and in a plane between said top and bottom tool heads, said tool heads each having tool holding means for holding at least one tool for cleaning the frame at a 45° angle along the corners of the window frame and for machining the frame at a 90° angle with respect to the top, bottom, ends and sides of the window frame, said top tool heads performing cleaning operations on the top of the window frame and said bottom tool heads performing cleaning operations on the bottom of the window frame, at least one of said top and said bottom tool heads being movable in three perpendicular dimensions; and clamping means for holding the vinyl window frame in each of said at least one operating positions during cleaning and machining of the window frame.

2. A vinyl weld seam cleaner apparatus as defined in claim 1 for cleaning weld seams on frames whose width extends in a horizontal direction, wherein said at least one support head is comprised of a first fixed support head and a second movable support head being movable in the horizontal direction relative to said fixed support head for accommodating window frames of various widths.

3. A vinyl weld seam cleaner apparatus as defined in claim 1, wherein each of said top and bottom tool heads are movable in three perpendicular dimensions.

4. A vinyl weld seam cleaner apparatus as defined in claim 1, and further comprising a top machine head and a bottom machine head mounted in each of said at least one support head, each of said top tool heads being mounted in said top machine heads and each of said bottom tool heads being mounted in said bottom machine heads, said machine heads being movable in one direction and each of said tool heads being movable in two directions with respect to the respective machine heads, causing said tool heads to be movable in three dimensions.

5. A vinyl weld seam cleaner apparatus as defined in claim 1, wherein at least one of said top and bottom tool heads move a tool held on said tool head along a 45° angle by interpolation.

6. A vinyl weld seam cleaner apparatus as defined in claim 1, wherein each of said top tool heads are mounted facing downwardly at a 30° angle relative to a plane parallel to the window frame and each of said bottom tool heads are mounted facing upwardly at a 30° angle relative to a plane parallel to the window frame wherein said tools being presented at a 30° angle relative to a plane parallel to the window frame.

7. A vinyl weld seam cleaner apparatus as defined in claim 1, wherein said clamping means includes a plurality of clamps having a first clamping position for holding the window frame during 45° operations and a second clamping position for holding the window frame during 90° angle operations.

8. A vinyl weld seam cleaner apparatus as defined in claim 1, said at least one tool in said tool heads having a first tool position for performing 45° operations at a 45° angle along the corners of the front end of the window frame, and a second tool position for performing 45° operations at a 45° angle along the corners of the back end of the window frame.

9. A vinyl weld seam cleaner apparatus as defined in claim 1, and further including a back fence, said back fence moving upwardly to assume an active position for stopping the motion of the window frame when the window frame moves into said operating positions and moving downwardly to assume an inactive position when the window frame moves out of said operating positions.

10. A vinyl weld seam cleaner apparatus as defined in claim 9, wherein at least one tool head has a pull-in block for moving the window frame adjacent to said back fence when said back fence assumes the active position.

11. A vinyl weld seam cleaner apparatus as defined in claim 1, wherein said tool holding means comprises means for releasably and interchangeably holding the tools.

12. A vinyl weld seam cleaner apparatus for cleaning the weld seam and machining a rectangular vinyl window frame having four 90° angle corners formed from a front end, a back end and sides of the frame, the frame having a top and a bottom, said apparatus comprising:

a first support head having a top tool head and a bottom tool head;

a second support head opposing said first support head, said second support head having a top tool head and a bottom tool head;

an inner conveyor system for moving a vinyl window frame in and out of a first and second cleaning position for positioning the window frame for weld seam cleaning operations on the forward end of the window frame and on the back end of the window frame, respectively, said cleaning positions being located between said first and second support heads, wherein each of said tool heads have holding means for including a plurality of tools for cleaning the frame at a 45° angle along the corners of the forward end of the window frame and for machining the frame at a 90° angle at the forward end of the window frame in the first cleaning position, and for cleaning the frame at a 45° angle along the corners of the back end of the window frame and for machining the frame at a 90° angle at the back end of the window frame in the second cleaning position; and clamping means for holding the vinyl window frame in said first and second cleaning positions during cleaning and machining of the window frame.

13. A vinyl weld seam cleaner apparatus according to claim 12, further comprising a back fence, said back fence being movable in the vertical direction and having an active position for stopping the motion of the window frame when the window frame moves into said first and second cleaning positions and having an inactive position when the window frame moves out of said first cleaning position.

14. A vinyl weld seam cleaner apparatus as defined in claim 12, wherein said inner conveyor system is comprised of:

a first belt adjacent to said first support head and a second belt adjacent to said second support head, said belts being movable in the vertical direction and having a first vertical active position for engaging a window frame and moving the window frame into and out of said first and second cleaning position and having a second vertical inactive position during window frame operation; and at least a pair of longitudinally opposed fixed side fences, each pair having one fixed side fence adjacent to said first support head and one fixed side fence adjacent to said second support head for guiding the window frame when said belts move said window frame into and out of said first and second cleaning positions.

15. A vinyl weld seam cleaner apparatus as defined in claim 14, and further including sensing means for detecting when the window frame is in said first and second cleaning positions.

16. A vinyl weld seam cleaner apparatus as defined in claim 15, wherein sensing means detect when said belts move the window frame out of said first cleaning position and past said second cleaning position, and belt reversing means responsive to said sensing means causing said belts to reverse direction and move the window frame back into said second cleaning position.

17. A vinyl weld seam cleaner apparatus as defined in claim 14, wherein said apparatus includes two pairs of longitudinally opposed fixed side fences, a first pair for guiding the window frame into and out of said first cleaning position and a second pair for guiding said window frame into and out of said second cleaning position.

18. A vinyl weld seam cleaner apparatus as defined in claim 17, and further including a first pair of movable side fences extending parallel to and longitudinally with said first pair of fixed side fences, said first pair of movable side fences having a first position fully retracted adjacent said first pair of fixed side fences for guiding said window frame into said first cleaning position and having a second position fully extended from said first pair of fixed side fences for guiding said window frame out of said first cleaning position, a second pair of movable side fences extending parallel to and longitudinally with said second pair of said fixed side fences, said second pair of movable side fences having a first position fully extended from said second pair of fixed side fences for guiding said window frame into said second cleaning position and having a second position fully retracted adjacent to said second pair of fixed side fences for guiding said window frame out of said second cleaning position.

19. A vinyl weld seam cleaner apparatus as defined in claim 18, wherein said movable side fences include a third position between said fully extended position and said fully retracted position.

20. A vinyl weld seam cleaner apparatus as defined in claim 19, wherein said clamping means is comprised of:
 a first pair of side clamps cooperating with said first pair of movable side fences to hold said window frame in said first cleaning position; and
 a second pair of side clamps cooperating with said second pair of movable side fences to hold said window frame in said second cleaning position.

21. A vinyl weld seam cleaner apparatus as defined in claim 20, wherein said side clamps have a first clamping position for cooperating with said movable side fences to hold the window frame in said first and second cleaning position when said movable side fences are in said third position for cleaning the window frame along a 45° angle, and said side clamps have a second clamping position for cooperating with said movable side fences to hold the window frame in said first and second cleaning position when said movable side fences are in a fully extended position to hold the window frame in said first and second cleaning position for machining along a 90° angle.

22. A vinyl weld seam cleaner apparatus according to claim 21, further comprising a back fence, said back fence being movable in the vertical direction and having an active position for stopping the motion of the window frame when the window frame moves into said first and second cleaning positions and having an inactive position when the window frame moves out of said first cleaning position.

23. A vinyl weld seam cleaner apparatus as defined in claim 22, and further including back clamps, said back clamps cooperating with said back fence when holding the window frame in said first and second clearing positions.

24. A vinyl weld seam cleaner apparatus as defined in claim 22, wherein at least one tool head has a pull-in block for moving the window frame adjacent to said back fence.

25. A vinyl weld seam cleaner apparatus for cleaning the weld seam of a rectangular vinyl window frame having four 90° corners formed from a front end, a back end and sides of the frame, the frame having a top and a bottom, said apparatus comprising:
 a fixed support head having a top machine head and a bottom machine head, a top tool head being mounted in said top machine head of said fixed support head and a bottom tool head is mounted in said bottom machine head of said fixed support head;
 a movable support head opposing said fixed support head, said movable support head being movable in a horizontal direction relative to said fixed support head for accommodating window frames of various widths, said movable support head having a top machine head and a bottom machine head, a top tool head being mounted in said top machine head of said movable support head and a bottom tool head being mounted in said bottom machine head of said movable support head, said top tool heads of said fixed and movable support head perform cleaning operations on the top of a window frame and said bottom tool heads of said fixed and movable support head performs cleaning operations on the bottom of the vwindow frame, wherein each of said machine heads of said fixed and movable support heads are movable in one direction, and each of said bottom and top tool heads of said fixed and movable support heads are movable in two directions causing said tool heads to move in three dimensions;
 an inner conveyor system for moving the vinyl window frame into and out of a first and second cleaning position, said first cleaning position being positioned for performing operations on the forward end of the window frame and said second cleaning position being positioned for performing operations on the back end of the window frame, said cleaning positions being between said fixed and movable support heads, wherein each of said tool heads include at least one tool for cleaning the frame at a 45° angle along the corners of the forward end of the window frame and for machining the frame at a 90° angle at the forward end of the window frame in the first cleaning position, and for cleaning the frame at a 45° angle along the corners of the back end of the window frame and for machining the frame at a 90° angle at the back end of the window frame in the second cleaning position, wherein tools that perform 45° operations do so by interpolation; and
 clamping means for holding the vinyl window frame in said first and second cleaning positions during cleaning and machining of the window frame.

26. A vinyl weld seam cleaner apparatus as defined in claim 25, wherein said top tool heads of said fixed and movable support heads are mounted facing downwardly at a 30° angle relative to a plane parallel to the window frame and said bottom tool heads of said fixed and movable support head are mounted facing upwardly at a 30° angle relative to a plane parallel to the window frame wherein tools present themselves at a 30° angle relative to a plane parallel to the window frame.

27. A vinyl weld seam cleaner apparatus as defined in claim 25, wherein said clamping means includes a plurality of clamps having a first clamping position for holding the window frame during 45° operations and a second clamping position for holding the window frame during 90° angle operations.

28. A vinyl weld seam cleaner apparatus as defined in claim 25, wherein the tools in said tool heads that perform 45° operations have a first tool position at a 45° along the corners of the front end of the window frame and have a second tool position at a 45° along the corners of the back end of the window frame.

29. A vinyl weld seam cleaner apparatus as defined in claim 25, and further including a back fence, said back fence being movable in the vertical direction and having an active position for stopping the motion of the window frame when the window frame moves into said cleaning positions and having an inactive position when the window frame moves out of said cleaning positions.

30. A vinyl weld seam cleaner apparatus as defined in claim 29, wherein at least one tool head has a pull-in block for moving the window frame adjacent to said back fence.

31. A vinyl weld seam cleaner apparatus as defined in claim 25, wherein said apparatus includes two pairs of longitudinally opposed fixed side fences, a first pair for guiding the window frame into and out of said first cleaning position, and a second pair for guiding said window frame into and out of said second cleaning position.

32. A vinyl weld seam cleaner apparatus as defined in claim 31, and further including a first pair of movable side fences extending parallel and longitudinally from said first pair of fixed side fences, said first pair of movable side fences having a first position fully retracted adjacent said first pair of fixed side fences for guiding said window frame into said first cleaning position and having a second position fully extended from said first pair of fixed side fences for guiding said window frame out of said first cleaning position, a second pair of movable side fences extending parallel and longitudinally from said second pair of said fixed side fences having a first position fully extended from said second pair of fixed side fences for guiding said window frame into said second cleaning position and having a second position fully retracted adjacent to said second pair of fixed side fences for guiding said window frame out of said second cleaning position.

33. A vinyl weld seam cleaner apparatus as defined in claim 32, wherein said movable side fences include a third position between said fully extended position and said fully retracted position.

34. A vinyl weld seam cleaner apparatus as defined in claim 32, wherein said clamping means is comprised of:
a first pair of side clamps, said side clamps cooperating with said first pair of movable side fences to hold said window frame in said first cleaning position; and
a second pair of side clamps, said side clamps cooperating with said second pair of movable side fences to hold said window frame in said second cleaning position.

35. A vinyl weld seam cleaner apparatus as defined in claim 12, and further including stopping means being movable in the vertical direction and having an active position for stopping the motion of the window frame when the window frame moves into said first and second cleaning positions and having an inactive position when the window frame moves out of said first cleaning position.

36. A vinyl weld seam cleaner apparatus for cleaning the weld seam of a rectangular vinyl window frame whose with extends in a horizontal direction and includes four 90° angle corners formed by a front end, back end and sides of the frame, the frame having a top and a bottom, said apparatus comprising:

a fixed support head having a top tool head and bottom tool head;

a movable support head having a top tool head and a bottom tool head, said movable support head being movable in the horizontal direction relative, said fixed support head for accomodating window frames of various widths;

transport means for moving a vinyl window frame into and out of at least one operating position located at a position adjacent said at least one support head and in a plane between said top and bottom tool heads, said tool heads each having tool holding means for holding at least one tool for cleaning the frame at a 45° angle along the corners of the window frame and for machining the frame at a 90° angle with respect to the top, bottom, ends and sides of the window frame, said top tool heads performing cleaning operations on the bottom of the window frame; and clamping means for holding the vinyl window frame in each of said at least one operating positions during cleaning and machining of the window frame.

37. A vinyl weld seam cleaner apparatus as defined in claim 36, wherein each of said top and bottom tool heads are movable in three perpendicular dimensions.

38. A vinyl weld seam cleaner apparatus as defined in claim 36, and further comprising a top machine head and a bottom machine head mounted in each of said at least one support head, each of said top tool heads being mounted in said top machine heads and each of said bottom tool heads being mounted in said bottom machine heads, said machine heads being movable in one direction and each of said tool heads being movable in two directions with respect to the respective machine leads, causing said tool heads to be movable in three dimensions.

39. A vinyl weld seam cleaner apparatus as defined in claim 36, wherein at least one of said top and bottom tool heads move a tool held on said tool head along a 45° angle by interpolation.

40. A vinyl weld seam cleaner apparatus as defined in claim 36, wherein each of said top tool heads are mounted facing downwardly at a 30° angle relative to a plane parallel to the window frame and each of said bottom tool heeds are mounted facing upwardly at a 30° angle relative to a plane parallel to the window frame wherein said tools being presented at a 30° angle relative to a plane parallel to the window frame.

41. A vinyl weld seam cleaner apparatus as defined in claim 36, wherein said clamping means includes a plurality of clamps having a first clamping position for holding the window frame during 45° operations and a second clamping position for holding the window frame during 90° angle operations.

42. A vinyl weld seam cleaner apparatus as defined in claim 36, said at least one tool in said tool heads having a first tool position for performing 45° operations at a 45° angle along the corners of the front end of the window frame, and a second tool position for performing 45° operations at a 45° angle along the corners of the back end of the window frame.

43. A vinyl weld seam cleaner apparatus as defined in claim 36, and further including a back fence, said back fence moving upwardly to assume an active position for stopping the motion of the window frame when the window frame moves into said operating positions and moving downwardly to assume an inactive position when the window frame moves out of said operating positions.

44. A vinyl weld seam cleaner apparatus as defined in claim 43, wherein at least one tool head has a pull-in block for moving the window frame adjacent to said back fence when said back fence assumes the active position.

45. A vinyl weld seam cleaner apparatus as defined in claim 36, wherein said tool holding means comprises means for releasably and interchangeably holding the tools.

* * * * *